(12) United States Patent
Pertusi

(10) Patent No.: US 6,889,790 B2
(45) Date of Patent: May 10, 2005

(54) FRONT AXLE OF AN AGRICULTURAL TRACTOR

(75) Inventor: Pierluigi Pertusi, Moderna (IT)

(73) Assignee: CNH America LLC, New Holland, PA (US)

(*) Notice: Subject to any disclaimer, the term of this patent is extended or adjusted under 35 U.S.C. 154(b) by 52 days.

(21) Appl. No.: 10/663,292

(22) Filed: Sep. 16, 2003

(65) Prior Publication Data

US 2004/0099466 A1 May 27, 2004

(30) Foreign Application Priority Data

Sep. 13, 2002 (IT) .................................... BO2002A0578

(51) Int. Cl.⁷ ............................................. B60K 17/30
(52) U.S. Cl. .................. 180/252; 180/378; 280/93.515
(58) Field of Search ...................... 280/93.502, 93.503, 280/93.51, 93.514, 93.515; 180/252, 267, 378; 301/137

(56) References Cited

U.S. PATENT DOCUMENTS 5,121,808 A * 6/1992 Visentini et al. ............ 180/435
6,179,308 B1 * 1/2001 Mielauskas et al. ...... 280/93.512
6,523,844 B2 * 2/2003 Panizzolo ............... 280/124.111
6,675,925 B2 * 1/2004 Takahashi et al. ........... 180/266
2002/0096382 A1 * 7/2002 Kielar et al. ................ 180/252

FOREIGN PATENT DOCUMENTS

| JP | 3182803 | * | 8/1991 | ........... B60B/35/14 |
| JP | 880757 | * | 3/1996 | ......... B60K/17/348 |

* cited by examiner

Primary Examiner—Anne Marie Boehler
Assistant Examiner—Matthew Luby
(74) Attorney, Agent, or Firm—Collin A. Webb; John William Stader

(57) ABSTRACT

A vehicle axle has two supporting members, which are engaged in rotary manner by respective vehicle wheels, are hinged to a frame of the axle, and are movable about respective hinge axes by at least one steering actuating cylinder acting on one of the supporting members; and a connecting bar having a central portion connected in sliding manner to the frame, and two lateral portions, each connected in rotary manner to one of the supporting members and to the central portion.

7 Claims, 2 Drawing Sheets

FRONT AXLE OF AN AGRICULTURAL TRACTOR

BACKGROUND OF INVENTION

1. Field of Invention

The present invention relates to a front axle of an agricultural tractor.

2. Background of Prior Art

The present invention relates to a front axle of a tractor of the type described, for example, in Italian Patent Application BO98A000676, to which the following description refers purely by way of example.

In the farm machinery sector, a tractor is known comprising a front axle supporting two front wheels of the tractor, and in turn comprising an elongated box body, and two lateral members, each of which is engaged in rotary manner by one of the wheels, and is hinged to the box body to rotate, with respect to the box body, about a respective hinge axis.

The box body has a central cavity, which houses a differential of a transmission assembly for transmitting power from an input shaft to the wheels, and which is closed by a cover at which the axle is connected to a free end of a supporting bar placed crosswise to the box body and for also supporting at least one upright supporting a frame of the tractor.

The angular position of the lateral members about the respective hinge axes is controlled by a steering assembly comprising at least one steering actuating cylinder acting on one of the lateral members, and a connecting bar extending between the lateral members, and which, when steering, oscillates about an instantaneous axis of rotation movable with a given law of motion, one component of which is parallel to the longitudinal axis of the tractor.

Known front axles of the above type therefore have the major drawback that, when the connecting bar is necessarily located behind the box body in the travelling direction of the tractor, to keep the front part of the tractor clear, e.g. to attach an operating unit, the distance between the supporting upright and the box body is greater than a given value to enable the instantaneous axis of rotation to move parallel to the longitudinal axis of the tractor, so that the tractor has a relatively long wheel base.

SUMMARY OF THE INVENTION

According to the present invention, there is provided a vehicle axle comprising a supporting frame; two lateral members engaged in rotary manner by respective vehicle wheels and connected in rotary manner to said frame to oscillate about respective axes of rotation; power transmission means interposed between said wheels and a power input shaft; and a steering assembly for controlling the angular positions of the lateral members about the relative axes of rotation, and comprising at least one steering actuating cylinder acting on one of the lateral members, and a connecting bar extending between the lateral members; characterized in that said connecting bar comprises a central portion engaging said frame in sliding manner; and two lateral portions, each connected in rotary manner to said central portion and to a relative said lateral member.

It is an object of the present invention to provide a vehicle axle designed to eliminate the aforementioned drawbacks.

BRIEF DESCRIPTION OF THE DRAWINGS

The present invention will now be described with reference to the annexed drawings, which illustrate some non-limiting examples of embodiment, in which.

DETAILED DESCRIPTION OF THE INVENTION

Figure 1:
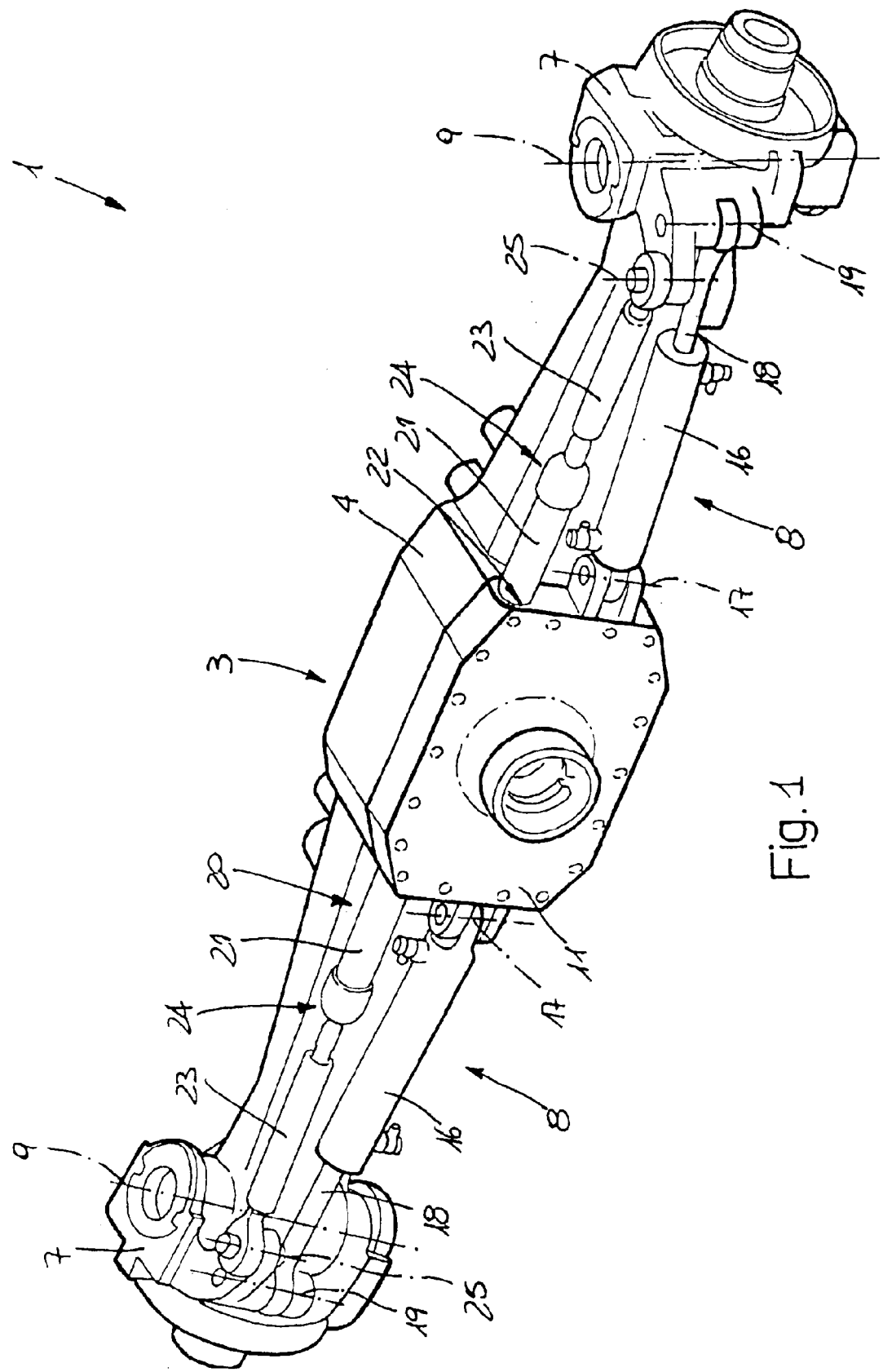
FIG. 1 shows a schematic view in perspective of a preferred embodiment of the axle according to the present invention.

Number 1 in the accompanying drawings indicates as a whole a vehicle axle—in the example shown, a front axle of a tractor (not shown).

Axle 1 supports two front wheels 2 of the tractor (not shown), and comprises a supporting frame 3, in turn comprising a central box body 4, which has a longitudinal axis 5 and two lateral members 7, each of which is engaged in rotary manner by one of wheels 2, is hinged to body 4, and is oscillated, with respect to body 4, about a respective hinge axis 9 by a steering device 8 described in detail later on.

Body 4 also comprises a central cavity 10 opening outwards and closed by a cover 11, which is fixed to body 4 and engaged in rotary manner, by the interposition of two rolling bearings 12, by an end portion 13 of an input shaft 14 for transmitting power to wheels 2 via a known transmission assembly 15 substantially housed in frame 3.

Steering device 8 controls the angular position of members 7 about respective axes 9, and comprises two steering actuating cylinders 16, each of which provides for moving one of members 7 about respective axis 9, is hinged to cover 11 to oscillate, with respect to cover 11, about a relative hinge axis 17, and has a relative output rod 18 hinged to relative member 7 to oscillate, with respect to relative member 7, about a hinge axis 19 substantially parallel to relative axis 17.

In a variation not shown, device 8 comprises one cylinder 16 acting on one of members 7.

Device 8 also comprises a connecting bar 20 extending between members 7, and in turn comprising a substantially straight central portion 21 engaging in axially sliding manner a guide hole 22 formed through cover 11 and having substantially the same cross section as portion 21.

In two variations not shown, portion 21 engages in sliding manner a sliding bearing or a bush extending through cover 11 to define hole 22.

Bar 20 also comprises two lateral portions 23 on opposite sides of portion 21. Each portion 23 has a first free end at which portion 23 is connected in rotary manner to portion 21 by the interposition of a spherical articulated joint 24, and a second free end at which portion 23 is hinged to relative member 7 to oscillate, with respect to relative member 7, about a relative hinge axis 25 substantially parallel to relative axis 19.

In a variation not shown, each portion 23 is connected to relative member 7 by the interposition of a further spherical articulated joint.

Figure 2:
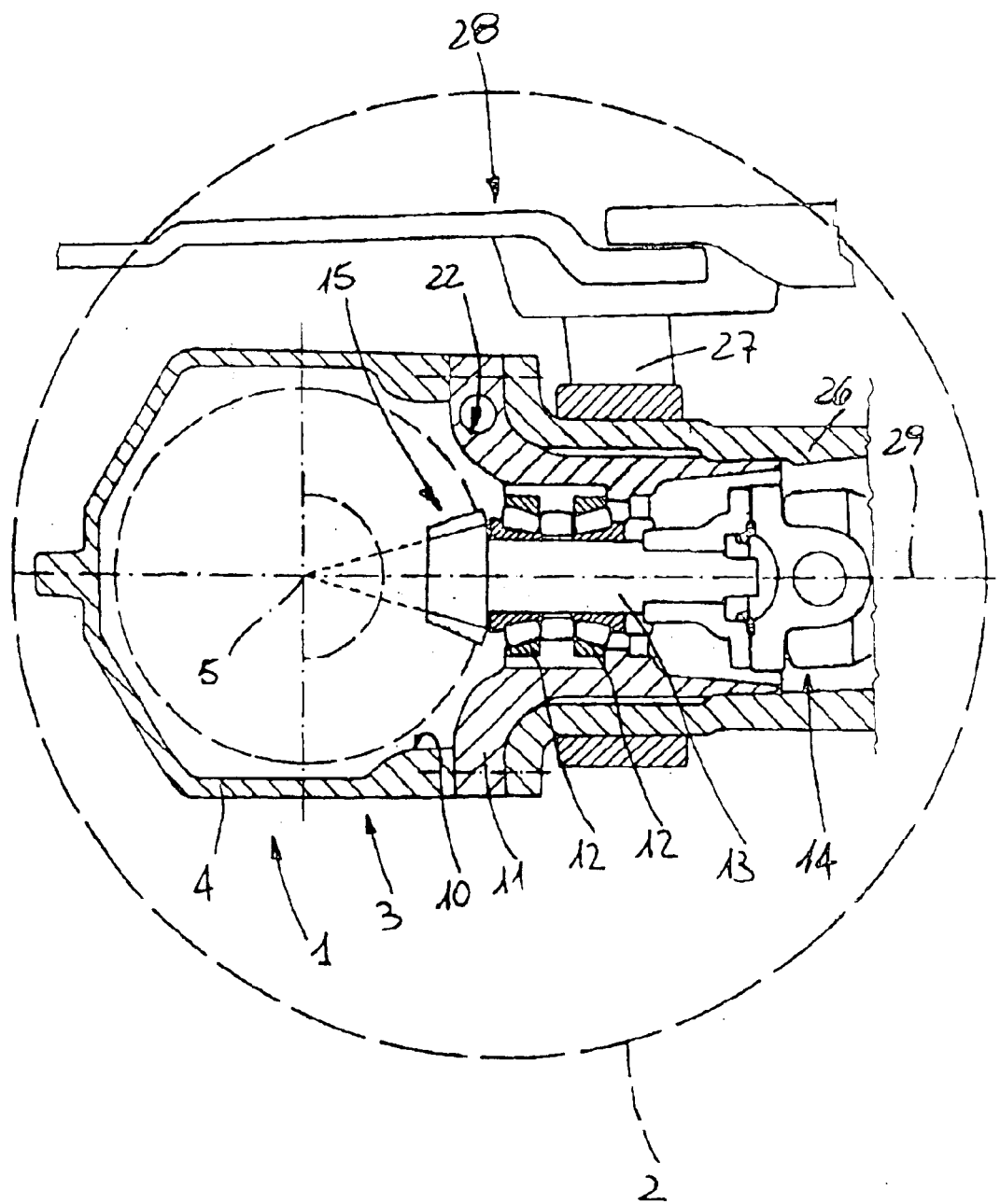
FIG. 2 shows a schematic side view, with parts in section and parts removed for clarity, of the FIG. 1 axle fitted to a tractor.

With reference to FIG. 2, once assembled, axle 1 is fixed to a supporting arm 26 (in the example shown, a suspension arm), which also supports an upright 27 supporting a frame 28 of the tractor (not shown).

Assembling central portion 21 of connecting bar 20 in sliding manner through cover 11 of box body 4 makes for a relatively compact axle 1 of relatively short longitudinal length measured parallel to a longitudinal axis 29 of the tractor (not shown).

The compactness of axle 1 therefore provides for maintaining below respective given values the wheel base of the tractor (not shown) measured parallel to axis 29, the distance between upright 27 and axis 5, also measured parallel to axis 29, and, consequently, the bending moment exerted on axle 1 by frame 28.

Axle 1 may obviously also be used as a rear axle of the tractor (not shown), if the rear wheels of the tractor (not shown) are also directional.

What is claimed is:

1. A vehicle axle comprising a supporting frame; two lateral members engaged in rotary manner by respective vehicle wheels and connected in rotary manner to said frame to oscillate about respective axes of rotation; power transmission means interposed between said wheels and a power input shaft; and a steering assembly for controlling the angular positions of the lateral members about the relative axes of rotation, and comprising at least one steering actuating cylinder acting on one of the lateral members, and a connecting bar extending between the lateral members; characterized in that said connecting bar comprises a central portion engaging said frame in sliding manner; and two lateral portions, each connected in rotary manner to said central portion and to a relative said lateral member.

2. The axle as described in claim 1, wherein said frame comprises a box body housing at least part of said transmission means; and a cover closing the box body; said cover being engaged in sliding manner by said central portion.

3. The axle as described in claim 2, wherein said cover has a guide hole having a cross section substantially similar to a cross section of said central portion.

4. The axle as described in claim 3, wherein said frame has a longitudinal axis; said central portion extending substantially parallel to said longitudinal axis.

5. The axle as described in claim 4, further comprising a spherical connecting means interposed between each said lateral portion and said central portion.

6. The axle as described in claim 5, further comprising a further spherical connecting means interposed between each said lateral portion and the relative said lateral member.

7. The axle as described in claim 5, wherein each said lateral portion is hinged to the relative said lateral member to oscillate about a relative hinge axis.

* * * * *